(12) United States Patent
Ohashi

(10) Patent No.: US 6,447,626 B1
(45) Date of Patent: *Sep. 10, 2002

(54) METHOD FOR PRODUCING JOINED BODY OF ALN SUBSTRATES AND JOINING AGENT USED FOR THE JOINING

(75) Inventor: Tsuneaki Ohashi, Ogaki (JP)

(73) Assignee: NGK Insulators, Ltd. (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/461,398

(22) Filed: Dec. 15, 1999

Related U.S. Application Data

(62) Division of application No. 08/941,388, filed on Sep. 30, 1997, now Pat. No. 6,028,022.

(30) Foreign Application Priority Data

Oct. 8, 1996 (JP) ............................................. 8-284623
Aug. 21, 1997 (JP) ............................................. 9-239133

(51) Int. Cl.$^7$ ............................................. C04B 33/34
(52) U.S. Cl. ..................... 156/89.27; 156/325; 428/697
(58) Field of Search ............................... 156/89.27, 325; 428/697

(56) References Cited

U.S. PATENT DOCUMENTS 5,096,863 A * 3/1992 Fukushima ............... 156/89.27
5,284,537 A * 2/1994 Kasori et al. ............ 156/89.27

FOREIGN PATENT DOCUMENTS

| JP | 2-124778 | 5/1990 |
| JP | 3-261131 | 11/1991 |
| JP | 5-101871 | 4/1993 |
| JP | 8-13280 | 1/1996 |

* cited by examiner

*Primary Examiner*—John J. Gallagher
(74) *Attorney, Agent, or Firm*—Parkhurst & Wendel, LLP

(57) ABSTRACT

A novel method for joining aluminum nitride-series substrates to each other is provided in the substantial absence of an intervening third layer at the joining interface between the substrates. In the method, the aluminum nitride-series substrates are joined to each other by interposing a joining agent between the substrates heating the substrates and the joining agent to a first temperature range of at least the melting point of the joining agent to melt the joining agent and liquefy particles of the aluminum nitride at the neighborhood of the interfaces between the melted joining agent and the substrates, and then heating the joining agent and the substrates to a temperature range higher than the temperature range of the first process but lower than the melting point of the substrates to exhaust the joining agent from between the substrates.

3 Claims, 5 Drawing Sheets

FIG_1a
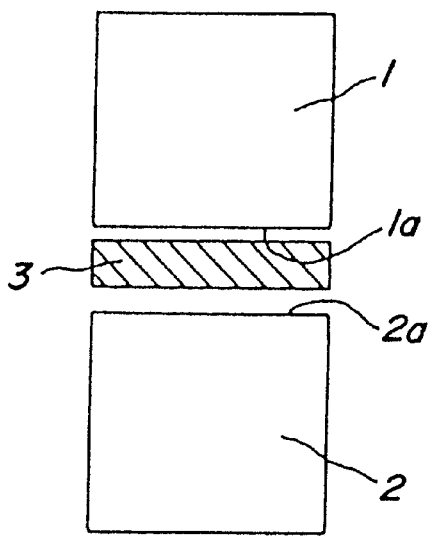
FIG_1b
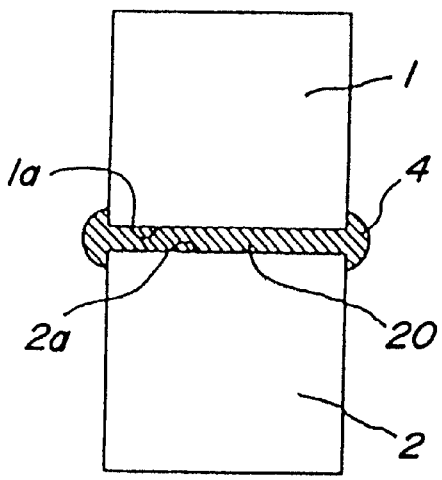
FIG_2a
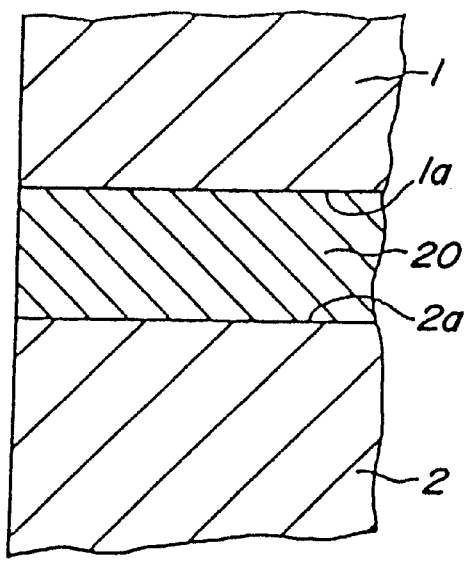
FIG_2b
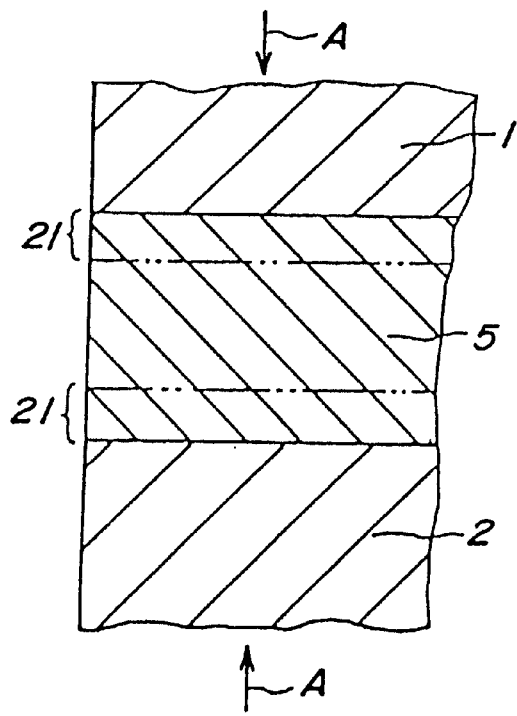

FIG_5

METHOD FOR PRODUCING JOINED BODY OF ALN SUBSTRATES AND JOINING AGENT USED FOR THE JOINING

This is a Division of application Ser. No. 08/941,388 filed Sep. 30, 1997, now U.S. Pat. No. 6,028,022

BACKGROUND OF THE INVENTION

1. Field of the Invention

The present invention relates to a method for producing a joined body of AlN substrate and a joining agent used for the joining.

2. Related Art Statement

Heretofore, in conventional semiconductor production apparatuses, such as, etching apparatuses, CVD apparatuses and the like, so-called stainless heaters and indirect heating system heaters are generally used. However, when these heating sources are used, there are problems in that they are likely corroded by halogen-series corrosive gases to form particles thereon and that they have inferior heat efficiency. In order to solve such problems, the applicant previously disclosed in his Japanese Patent Application Laid-Open No. 3-261,131 a ceramic heater having a heating wire of high melting point embedded in a dense ceramic substrate, the wire being spirally wound in the interior of the substrate of a disc shape and connected at the both ends with an electric terminal, respectively. Such a type of ceramic heaters are found to have superior characteristic properties, particularly for the production of semiconductors.

As the ceramic materials constituting the substrate of the ceramics heaters, silicon nitride, aluminum nitride, Sialon and the like nitride-series ceramic materials are considered preferable. In some cases, a susceptor is provided on the ceramic heater and a semiconductor wafer is mounted and heated on the susceptor. The applicant previously disclosed in his Japanese Patent Application Laid-Open No. 5-101,871 that aluminum nitride is preferable as the substrate for such ceramic heaters and susceptors. This is because, particularly in semiconductor production apparatuses, $ClF_3$ and the like halogen-series corrosive gases are often used as etching gases or cleaning gases, and aluminum nitride was found to have an excellent corrosion resistant property to such halogen-series corrosive gases. Meanwhile, because ceramic materials are difficult to process, researches have been made of joining ceramic materials of simple shapes to each other to obtain a ceramic element or part of complicated shapes.

Nevertheless, at a joining interface between ceramic members a third phase having a different thermal expansion coefficient and mechanical properties is usually formed. The third layer has a problem in that it is usually easily broken by a thermal stress due to heating and cooling and various mechanical stresses. Particularly, in the case of aluminum nitride-series ceramics materials, the influence of the third layer was serious, because of their low tenacity as compared with silicon nitride-series ceramic materials, etc.

If aluminum nitride-series ceramic materials are joined to each other by means of a glass or a compound consisting mainly of silicon, the third phase remaining on the joining interface is selectively corroded by a plasma of $NF_3$, $ClF_3$ or the like halogen series-corrosive gases. Thus, such joined bodies could not withstand the use under the corrosive environment of the semiconductor production apparatuses.

There is also a method of directly joining the substrates made of aluminum nitride sintered bodies to each other as described in Japanese Patent Application Laid-Open No. 2-124,778, wherein the substrates are heated at 1,800–1,900° C. and joined integrally by diffusion joining. However, in order to join the aluminum nitride sintered bodies by such a diffusion joining method, an extremely high temperature is necessary of, for example, 1,800–1,900° C. which is substantially the same high temperature with the sintering temperature for producing the original aluminum nitride sintered bodies. Henceforth, in the joining process the substrates are likely degraded and deformed. In addition, joined bodies of a low strength of not more than about 60 MPa could only be obtained.

According to Japanese Patent Application Laid-Open No. 8-13,280, a joined body of aluminum nitride sintered bodies is disclosed having a relatively high strength. However, in this method also, a substantially the same high temperature with the sintering temperature for producing the aluminum nitride sintered bodies of the original substrates is required. In addition, super precise processing of the joining surfaces of the substrates of a roughness and a flatness respectively of not more than 0.2 $\mu$m is required. Such a super precise processing increases the production cost.

SUMMARY OF THE INVENTION

An object of the present invention is to provide a novel method of producing a joined body of aluminum nitride-series substrates to each other in the substantial absence of an intervening third layer at the joining interface of the substrates.

The present invention is a method of producing a joined body of aluminum nitride-series substrates, comprising a first step of interposing a joining agent between the substrates to be joined, and heating the substrates and the joining agent at a temperature range of not less than the melting point of the joining agent to thereby melt the joining agent and liquefying particles of the aluminum nitride-series substrates to a liquid phase adjacent the interfaces between the melted joining agent and the substrates, and a second step of heating the substrates and the joining agent at a temperature range of higher than the temperature range of the first step, but lower than the sintering temperature of the substrates to thereby exhaust the joining agent from between the substrates.

The inventors have made many researches on methods of joining the aluminum nitride-series ceramic materials at relatively low temperatures without interposing a third phase. For that purpose, the inventors have made many experiments of interposing various metal oxides between the aluminum nitride-series ceramic materials and heating and melting the metal oxides. As a result, the inventors have found out that when the joining agent is at first melted and then heated and held at a temperature higher than the melted temperature, the joining agent is exhausted from between the substrates thereby to form a firm joining between the substrates. Observation of the interface of these substrates revealed that the joining agent is substantially not remained to leave a continuous texture of aluminum nitride substrates. In addition, the inventors have found out a finding leading to the present invention that the thus obtained joined body has very a high joining strength and much superior airtight property and corrosion resistant property.

BRIEF EXPLANATION OF THE DRAWING

For a better understanding of the present invention, reference is made to the accompanying drawings, in which:

FIG. 1a is a schematic front view of substrates with a joining agent interposed therebetween showing the state before the joining thereof;

FIG. 1b is a schematic front view of the substrates 1 and 2 after the joining thereof showing the state that the joining agent was melted in the area of the interfaces of the substrates;

FIG. 2a is a schematic partial cross-sectional view of substrates with a joining agent melted between the substrates;

FIG. 2b is a schematic partial cross-sectional view of the substrates showing the state of the area of the joining interfaces between the substrates and the melted layer of the joining agent are melted;

Numbering in the Drawings;

Figure 3:
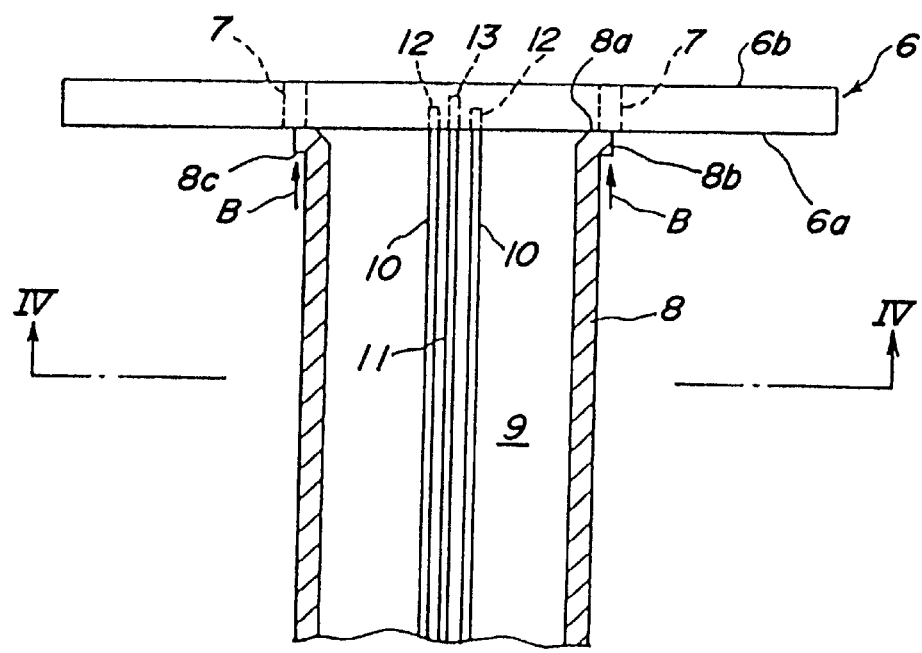
FIG. 3 is a schematic partial cross-sectional view of an embodiment of a structure for holding a susceptor prepared by joining the susceptor and a circular retaining member.

1, 2 substrate
1a, 2a face of the substrates 1, 2 to be joined
3 joining agent
4 expanded portion of melted layer of joining agent
5 melted layer of joining agent
6 susceptor
7 throughhole
8 holding member
9 inner space of the holding member 7
10, 11 electric cable
12 terminal of heat generating-resistive member
13 terminal of electrode
20 melted layer of joining agent
21 liquefied neighborhood of the interface between the substrates

DETAILED DESCRIPTION OF THE INVENTION

Hereinafter, the present invention will be explained in more detail with reference to attached drawings.

In the aluminum nitride-series ceramic material constituting the substrates, various sintering agents, coloring matters or other additives can be incorporated. As shown schematically in FIG. 1, a face 1a of a substrate 1 to be joined and a face 2a of a substrate 2 to be joined are opposingly arranged. At that time, a selected joining agent 3 is interposed between the faces 1a and 2a of the substrates 1 and 2 to be joined. Then, the substrates 1 and 2 and the joining agent 3 are heated to at least the melting point of the joining agent 3 to melt the joining agent 3, as shown in FIG. 1b. A portion of the melted portion 20 of the joining agent 3 is displaced, while wetting the surfaces 1a and 2a of the substrates 1 and 2, to form an outer expanded portion 4, as shown in FIG. 1b.

In the early stage of the melting of the joining agent 3, the melted portion 20 remains between the surfaces 1a and 2a to be joined. However, when they are held at a temperature not lower than the melting point of the joining agent 3, portions 21 of the substrates 1 and 2 in the area of the melted portion 20 convert to a liquid state. Reference numeral 5 indicates a melted layer of the joining agent 3. When a joining agent 3, for example, made of an oxide of a Ca—Al—O series eutectic composition or a Y—Ca—Al—O series eutectic composition is used, it is considered that the melting of the joining agent begins at around 1,415° C. or 1,375° C. and then the surfaces 1a and 2a of the substrates 1 and 2 contact with the melted joining agent to become liquefied.

Aluminum nitride-series ceramic materials usually experiences a sintering process which is a so-called "liquid phase sintering". That is, aluminum nitride-series ceramic materials experiences a process that the aluminum nitride particles are once liquefied and then solidified during the cooling step. In the present invention also, aluminum nitride-series particles are considered to liquefy in the area of the interfaces between the melted joining agent 3 and the substrates 1 and 2 to form a liquid phase, and the components of the joining agent 3 are diffused through the liquid phase to change the composition of that portion.

When the aluminum nitride particles are melted into the liquid phase, protruded portions of the surfaces 1a and 2a to be joined are preferentially melted into the melted joining agent. Thus, the surfaces 1a and 2a are flattened. If they are cooled thereafter without performing the second process, the components of the joining agent are precipitated at the crystal grain boundaries of the aluminum nitride particles.

In the melting process (first process), the heating is effected at a temperature of at least the melting point of the joining agent. Preferably the heating is effected below a temperature at which the later described exhaust of the joining agent substantially occurs so as to avoid exhaust of the joining agent at this process.

Then, in the second process when the temperature is raised to a temperature higher than the first process, the melted joining agent is substantially exhausted from between the substrates to provide a continuous body of substrates without an intervening third phase. This mechanism is similar to the mechanism of exhausting a sintering agent, such as yttrium etc., from liquefied aluminum nitride particles and exhausting further to the exterior of sinterd body of aluminum nitride particles from the interior of the sinterd body, at the time of solidifying aluminum nitride from a liquid phase to precipitate aluminum nitride particles.

The present invention is suitable for aluminum nitride-series ceramic materials having a relative density of at least 95%, and particularly suitable for aluminum nitride-series ceramic materials having a relative density of at least 98%. The present invention is particularly suitable when at least one of the aluminum nitride-series ceramic materials is a fired product produced by a hot press sintering process or a hot isotactic pressing process, because deformation or the like deficiency may occur sometimes, when the present invention is applied to a calcined body or the like having a large specific surface area.

In the first and second processes, constant temperatures are preferably maintained in the respective temperatures range of the processes. However, the temperature in the first and second processes may be changed higher or lower in the respective temperature range of the processes. Particularly, the temperature range in the first process is preferably at least 1,400° C. in order to securely melt the joining agent, and more preferably at least 1,450° C. in order to accelerate the liquefaction of the aluminum nitride particles at their interface between the joining agent. If the exhaustion of the joining agent proceed in the first process, diffusion or invasion of the joining agent into the substrates becomes difficult to proceed. Thus, in order to inhibit the exhaustion of the joining agent, the temperature in the first process is preferably not more than 1,650° C.

The temperature range in the second process is preferably at least 1,650° C. in order to accelerate the exhaustion of the joining agent, preferably not more than 1,800° C. in order to prevent deformation and alteration etc. of the aluminum nitride-series substrates.

Heating time in the first and second processes is preferably at least 30 min and not more than 10 hrs.

Atmosphere in the first and second processes can be an inert gas such as N2 etc. so far as it is a non-oxidizing atmosphere, or it may be vacuum. In the second process, nitrogen atmosphere is particularly preferable, because decomposition of aluminum nitride though in minor extent was observed in vacuum.

Preferably, a pressure is exerted as shown by the arrow A in FIG. 2b at the time of joining, in order to further improve the joining strength. Practical effect of the exertion of pressure can be exhibited from a pressure of at least 5 kg/cm$^2$ with an upper limit of 500 kg/cm$^2$. Exertion of a pressure exceeding the upper limit tends to easy deformation or cracks in the substrates. If the pressure is exerted at a low temperature, the substrate is liable to split. Thus, the pressure is preferably exerted at a temperature of not lower than the melting point of the joining agent.

Next, the joining agents which can particularly satisfactorily be used in the present invention will be explained. The inventors have found out that the joining agents are not specifically limited, however, those joining agents having an X—Y—Z series composition are particularly preferable, wherein X is a compound of at least one metallic element selected from the group consisting of alkali metal elements and alkaline earth metal elements, Y is a compound of rare earth elements, and Z is a compound of aluminum. Among the all metallic elements constituting the joining agent, the proportion of the metallic elements constituting X is 25–50 mol %, the proportion of the rare earth elements constituting Y is 5–30 mol %, and the rest is aluminum.

In the aluminum nitride-series substrates, exhaustion of the joining agent proceeds at a temperature exceeding 1,6500° C. and the joining agent can hardly invade into the aluminum nitride at such high temperatures. Therefore, the joining agent is selected so as to have a melting point of not higher than 1,650° C. and preferably a melting point of not higher than 1,600° C. In the present invention, the expression "melting point of the joining agent" means a temperature at which the liquid phase begins to form.

Rare earth elements used herein means seventeen elements of scandium, yttrium, lanthanum, cerium, praseodymium, neodymium, promethium, samarium, europium, gadolinium, terbium, dysprosium, holminm, erbium, thulium, ytterbium and lutetium. Among these elements, yttrium, lanthanium, cerium, neodium and ytterbium have particularly high effect of exhausting the joining agent, and yttrium and ytterbium are more preferable, and yttrium is most preferable.

As the metallic elements constituting X, lithium, calcium, strontium and barium are particularly preferable.

As the compounds of X, the compounds of Y and the compounds of Z, embodically oxides or fluorides are preferable. Compounds other than oxides and fluorides can be used, however, compounds which can produce oxide or fluoride at the time of melting the joining agent are preferable in such circumstances. As such compounds, carbonates, nitrates, oxalates and phosphonates are mentioned.

Preferable compositions of the joining agent are exemplified above, and the joining agent includes the followings:

(1) Mixtures composed of compound of X, compound of Y and compound of Z. In these cases, the above-described oxides, fluorides, carbonates, nitrates, oxalates and phosphonates etc, can be uses as the compound of X, compound of Y and compound of Z.

(2) Compounds containing all the components X, Y and Z. For example, an oxide of a metal constituting X, an oxide of a metal constituting Y and an oxide of a metal constituting Z can be mixed to obtain a mixture, and the mixture can be calcined or fired to obtain a complexed compound or a glass. The complexed compound or the glass can be used as the joining agent.

The joining agent may have a shape of a mixed powder, a calcined powder, a foil or a flat plate.

Among the joining agents, those joining agents wherein at least one of the component X and the component Y contains an oxide or a fluoride having a vapor pressure of 0.001–1, 000 Pa at 1,650–1,800° C. are preferable. As concrete examples of such oxide or fluoride, $Li_2O$, $MgO$, $CaO$, $SrO$, $BaO$ and $SrF_2$ may be mentioned.

Particularly preferable are joining agents of a series of 25–40 wt % of CaO, 15–30 wt % of $Y_2O_3$ and the rest of $Al_2O_3$. Among these joining agents, joining agents of an eutectic composition of 37 CaO—19 $Y_2O_3$—44 $Al_2O_3$ (melting point is 1,375° C.) and an eutectic composition of 28 CaO—26 Y2O$_3$—46 $Al_2O_3$ (melting point is 1, 395° C.) are particularly preferable.

Figure 4:
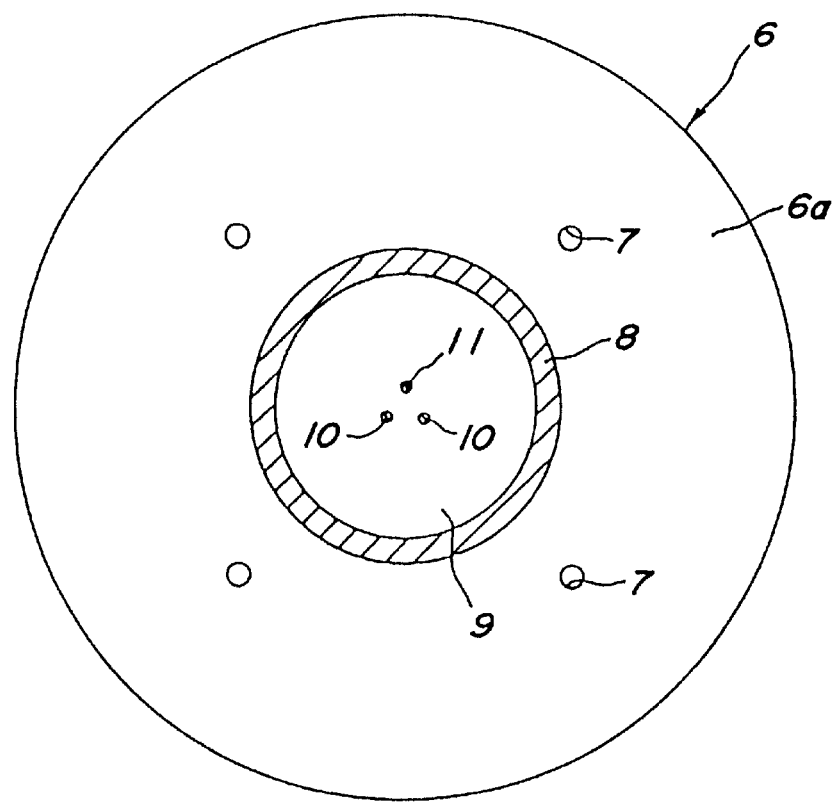
FIG. 4 is a plan view of the holding structure of FIG. 3.

FIG. 3 is a schematic cross-sectional view of a structure for holding a suspect 6 for use in the production of semiconductors, and FIG. 4 is a schematic partial cross-sectional view of the structure of FIG. 3 along the line IV—IV. The susceptor 6 has a shape of disc, for example, and a semiconductor wafer can be provided on the front surface 6b of the susceptor 6. To the back surface 6a of the susceptor 6 is joined an end surface 8a of a holding member 8 of, for example, a substantially cylindrical shape. The susceptor 6 and the holding member 8 are both made of aluminum nitride series material and joined to each other according to the present invention. Referential numeral 7 is a throughhole for inserting a lift pin. Preferably, when forming a flange portion 8b at around the end surface 8a of the holding member 8, a pressure can be exerted on a peripheral edge surface 8c of the flange portion 8b, as shown by the arrow B in FIG. 3.

Function and structure of the susceptor 6 are not limited specifically, and illustrative examples thereof are ceramic electrostatic heater having a heat-generating resistive body embedded in the aluminum nitride series-substrate, a ceramic electrostatic chuck having an electrode for the electrostatic chuck embedded in the substrate, a heater with an electrostatic chuck having a heat-generating resistive body and an electrode for the electrostatic chuck embedded in the substrate and an electrode apparatus for generating a high frequency wave having a plasma-generating electrode embedded in the substrate.

For instance, in the apparatus shown in FIGS. 3 and 4, a heat-generating resistive body not shown is embedded in the susceptor 6 and cables 10 are connected to terminals 12 of the heat-generating resistive body. In the susceptor 6 is embedded a not shown plate-shaped electrode which functions as a plasma-generating electrode or an electrode of electrostatic chuck, and a cable 11 is connected to the terminal 13 of the electrode. These cables 10, 11 and the terminals 12, 13 are all accommodated in the inner space 9 of the holding member 8 and do not directly contact to a corrosive gas or plasma thereof in the chamber of the semiconductor production apparatus.

In addition, the present invention can be used for joining a susceptor for mounting a semiconductor wafer, a damy wafer, a shadow ring, a tube for generating a high frequency plasma, a dome for generating a high frequency plasma, a high frequency wave-permeating window, an infrared wave-permeating window, a lift pin for supporting a semiconductor wafer or a shower plate, etc. to another member.

DESCRIPTION OF PREFERRED EMBODIMENTS

Hereinafter, the present invention will be explained in more detail with reference to concrete experimental results.

COMPARATIVE TEST 1

Aluminum nitride blocks 1, 2 having a size of 20 mm×20 mm×10 mm as shown in FIG. 1a were ground at joining surfaces 1a, 2a by a No. 800 grinding stone. At that time, one block had a purity of 95% (5% was yttria), while the other block had a purity of 99.9%.

Figure 6:
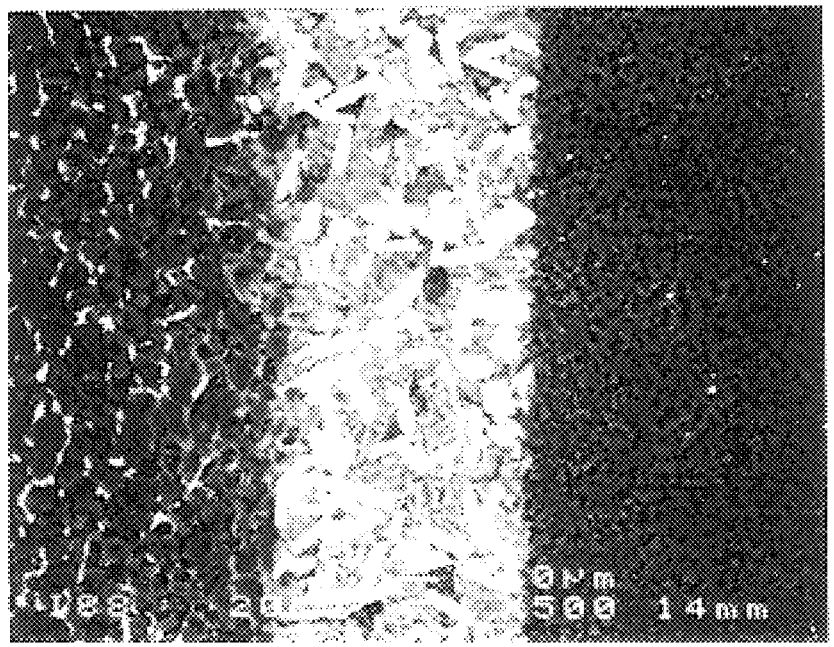
FIG. 6 is a photograph taken by a reflective electron image showing a ceramic tissue in the area of the interface of the joined body obtained by Experiment 1 shown in Table 1.
Figure 7:
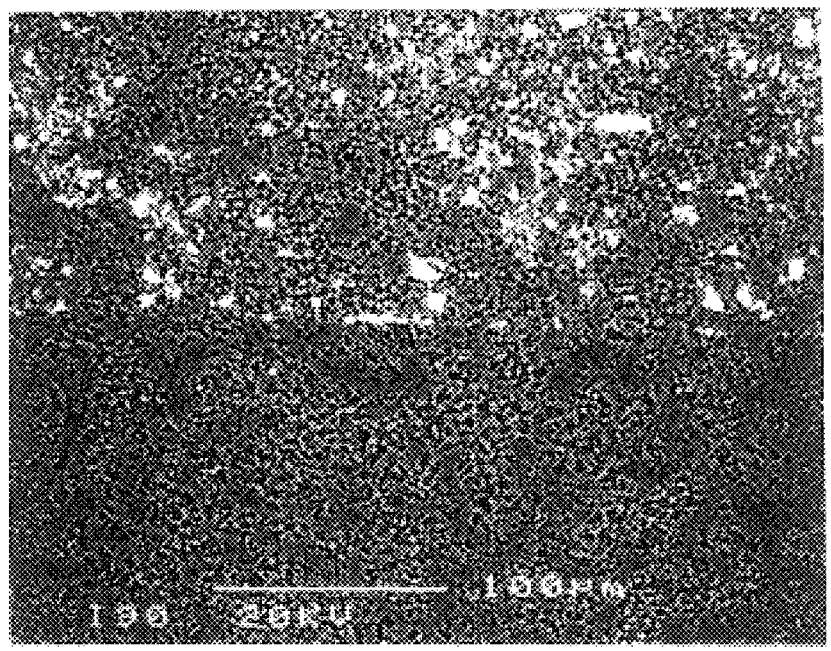
FIG. 7 is a photograph taken by a reflective electron image showing a ceramic tissue in the area of the joining interface of a bending test specimen obtained by Experiment 2 shown in Table 1.

Between the two blocks was interposed a powder mixture prepared to have a composition in weight basis of 37 $CaO$—19 $Y_2O_3$—44 $Al_2O_3$ (having an eutectic point of 1,375° C.). The prepared sample was put in an electric furnace, heated up to 1,500° C., held for 2 hrs and left to cool in the furnace. The heating was carried out in a nitrogen atmosphere. During the heating, a pressure of 50 $kgf/cm_2$ was continuously exerted on the joining surfaces. A cross-section of the sample was observed by a photograph taken by a survey type microscope and a reflex electron image. FIG. 6 is a photograph of a reflex electron image showing a ceramic tissue adjacent the joining interface of the joining body.

In the photograph shown in FIG. 6, the ceramic tissue is seen to separate into three layers of an aluminum nitride layer of a purity of 95%, a joining agent layer and an aluminum nitride layer of a purity of 99.9%, as shown from the left side. In the left aluminum nitride layer, white crystal grain boundary layers consisting mainly of yttria are seen at black crystal grain boundary layers of aluminum nitride particles. In the joining agent layer, white needle-shaped crystals and a gray matrix surrounding the white crystals can be observed. Though both the white needle-shaped crystals and the gray matrix were produced from the joining agent having a eutectic composition of 37 $CaO$—19 $Y_2O_3$—44 $Al_2O_3$, they are considered to have different compositions from each other. The right aluminum nitride layer consists almost of black aluminum nitride particles and a few crystal grain boundary layers.

In the neighborhood of the interface between the left aluminum nitride layer and the joining agent layer, the crystal grain boundary layers of aluminum nitride particles are not white (showing the presence of yttria) but pose the same color with the matrix of the joining agent layer, (thus showing the invasion of the joining agent into the crystal grain boundary layers.) Thickness of the invaded portion of the joining agent was reached about 10 $\mu$m. This is because, at the time of the process of heating and holding at 1,500° C., aluminum nitride particles were melted at the neighborhood of the interface between the substrate and the melted joining agent and the components of the joining agent were diffused.

Also, in the neighborhood of the interface between the right aluminum nitride layer and the joining agent layer, invasion of the joining agent of 0.5 $\mu$m or more was seen in the crystal grain boundary layer of the AlN particles.

COMPARATIVE TEST 2

The processes of Comparative Test 1 were repeated except that the compositions of the joining agent were changes to CaO, CaF, $Y_2O_3$, $Y(NO_3)3$ or YN to perform the above experiments, respectively. As a result, substrates 1 and 2 could not be joined in all the examples.

Test 3

Experiment Nos. 1–7 included in the scope of the present invention as shown in Table 1 were put into practice.

Aluminum nitride blocks 1, 2 having a size of 20 mm×20 mm×10 was shown in FIG. 1a were ground at joining surfaces 1a, 2a by a No. 800 grinding stone. At that time, one block had a purity of 95% (5% was yttria), while the other block had a purity of 99.9%.

Powders of CaO, $Y_2O_3$ and $Al_2O_3$ of specific reagent grades were mixed in ethanol in a weight % ratio of 37 $CaO$—19 $Y2O_3$—44 $Al_2O_3$ to obtain a mixed powder of an eutectic point of 1, 375° C. Then, the mixed powder was heated in air at 1,000° C. for 2 hrs to obtain a calcined powder. The calcined powder was adjusted to have a maximum particle diameter of 100 $\mu$m. The adjusted powder was interposed between the surfaces of the two substrates to be joined. Applied amount of the joining agent was 1–20 $mg/cm^2$.

Figure 5:
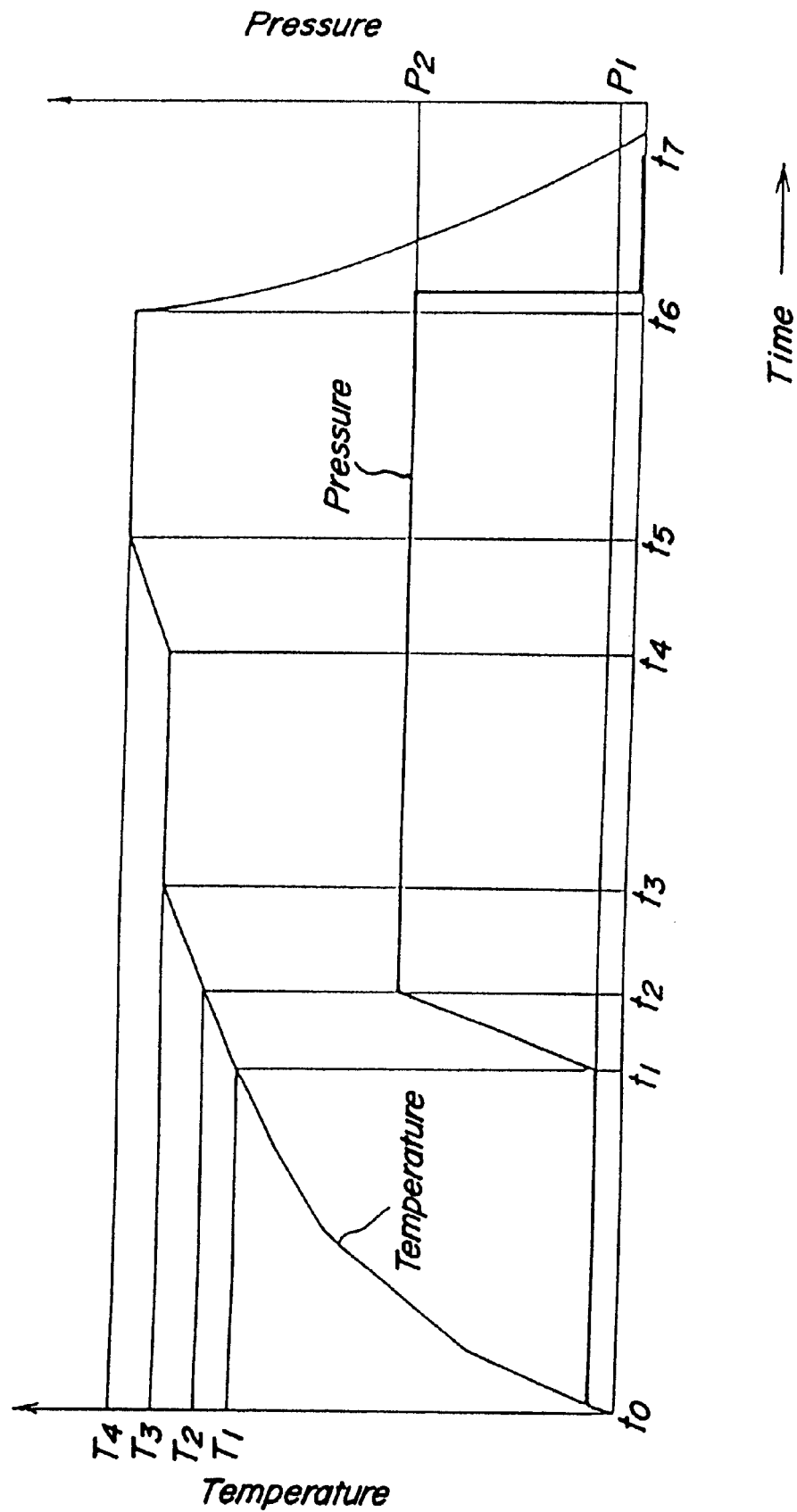
FIG. 5 is a graph of an example of pressure and temperature schedules.

The thus obtained sample was put in an electric furnace and heated based on a temperature—pressure schedule as shown in FIG. 5, wherein t0–t7 represent elapsed heating time, respectively, T1–T4 represent heating temperature, respectively, and P1 and P2 are pressures. When the temperature reached to T1=1,400° C. at the time of t1, the pressure was began to exert, and when the temperature reached to T1=1,430° C. at the time of t2, the pressure was increased to the respective value as shown in Table 1. By heating for a time of t3, the sample reached to a temperature T3, wherein T3 is a holding temperature of the sample at the first holding process, and a difference between the times t4 and t3 is a holding time at the temperature T3.

Then, the temperature of the sample was raised to a temperature T4 from the time t4 to the time t5, wherein T4 is a holding temperature of the sample at the second holding process, and a difference between times t6 and t5 is a holding time at the temperature T4. Joinings of the substrates were put into practice based on such a temperature—pressure schedule, and the thus obtained joined bodies were measured on respective properties. The measured results are shown in Table 1.

"Joining strengths" were measured by a method of measuring a four-point bending strength according to Japanese Industrial Standard (JIS) R 1601, however, the specimen prisms for the bending tests were processed to have the joining interface at the center thereof. The joining strengths were measured at room temperature. Cross-sections of the specimens were observed by a survey type electron microscope to find residual levels of the components of the joining agent. With regard to "the residuum of the third layer", the joining interfaces were observed and thicknesses of the third layer were measured. Meanwhile, "thickness of the applied joining agent layer" were calculated from a formula of applied amount/theoretical density of the joining agent/joining area, and values obtained by dividing "thickness of the third layer" by "thicknesses of the applied joining agent layer" were shown in Table 1.

The values of "leakage amount" in Table 1 were measured as follows. A round disc of a diameter of 50 mm and a thickness of 15 mm was used as one substrate, while a round pipe of an outer diameter of 36 mm, an inner diameter of 28 mm and a length of 10 mm was used as the other substrate. The round disc and the round pipe were joined as shown in FIG. 4, using the same joining method as described above. The thus obtained joined body was subjected to a helium leakage test. Measuring limit of the used testing machine was $10 \times 1.0^{-8}$ torr ·1/sec.

upper aluminum nitride layer, white crystal grain boundary layers consisting mainly of yttria are seen at the crystal grain boundary of black aluminum nitride particles. In the lower aluminum nitride layer, yttria is not observed.

In the neighborhood of the interface between the upper and lower aluminum nitride layers, the sizes of aluminum nitride particle and the sizes of crystal grain boundaries in the upper and lower layers differ certainly, so that a distinct boundary can be observed. In the boundary, no second phase or crack is existent to understand that the upper and lower aluminum nitride tissues are directly continuously joined.

Figure 8:
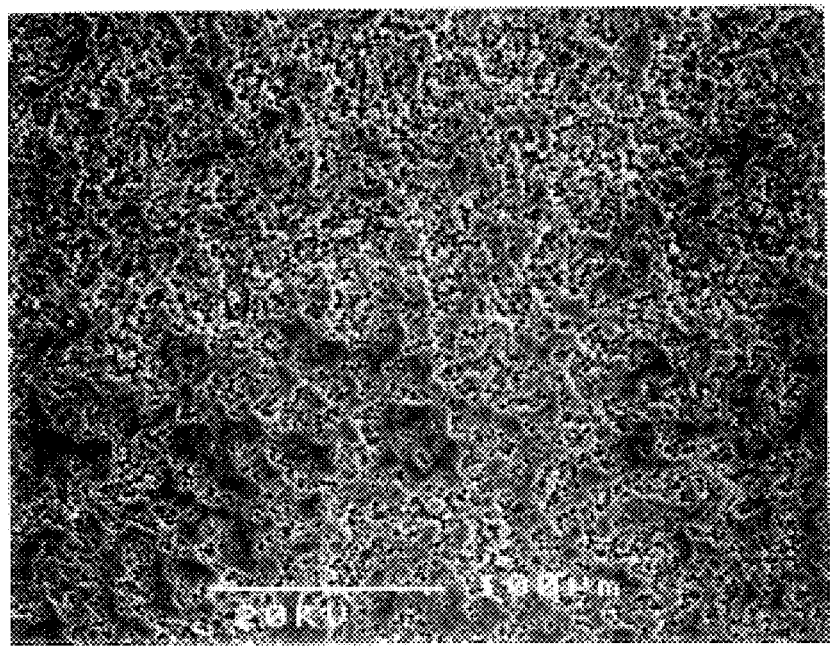
FIG. 8 is a photograph of a secondary electron image showing a ceramic tissue at the neighborhood of the joining interface of the joined body after treatment of the joined body of FIG. 7 by a heating cycle test.

FIG. 8 is a secondary electron image showing the ceramic tissue at the neighborhood of the joining interface of the bending test specimen after the above described heating cycle test. The secondary electron image is seen from the upper side to separate into two layers of an upper aluminum nitride layer of a purity of 95% and a lower aluminum nitride layer of a purity of 99.9%. At the interface between the two layers, no crack or deteriorated layer can be seen.

Figure 9:
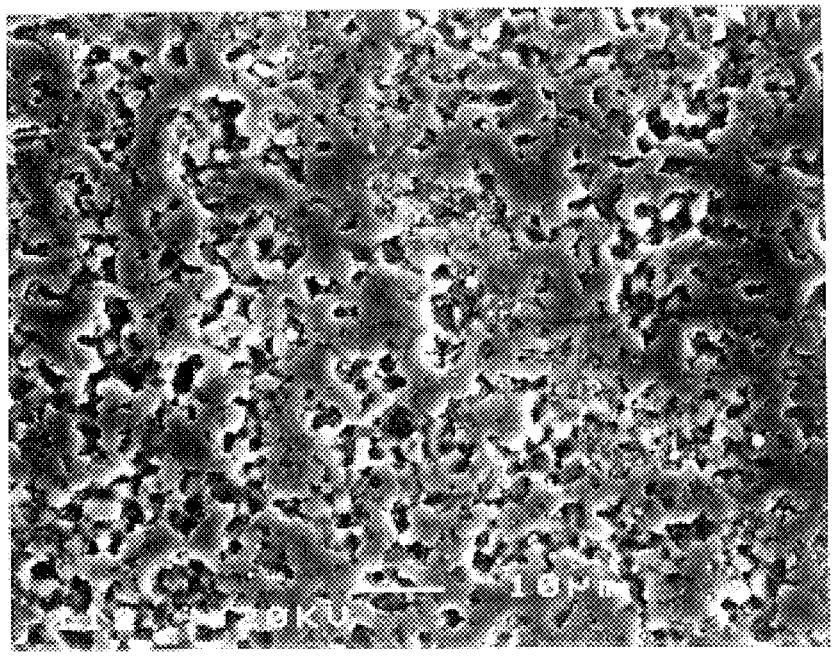
FIG. 9 is a photograph of a secondary electron image showing a ceramic tissue at the neighborhood of the joining interface of a bending test specimen obtained by Experiment 1 shown in Table 1.

FIG. 9 is a secondary electron image showing the ceramic tissue at the neighborhood of the joining interface of the

TABLE 1

| | | 1 | 2 | 3 | 4 | 5 | 6 | 7 |
|---|---|---|---|---|---|---|---|---|
| Purity | Substrate 1 | 99.9% | 95% | 95% | 95% | 95% | 95% | 95% |
| of AlN | Substrate 2 | 99.9% | 99.9% | 95% | 99.9% | 99.9% | 99.9% | 99.9% |
| Joining agent | Composition | | | 37CaO—19$Y_2O_3$—44$Al_2O_3$ | | | | |
| | Shape | | | Calcined powder | | | | |
| Temperature and time in the first holding process | | 1,550° C. 2 hrs | 1,550° C. 2 hrs | 1,600° C. 2 hrs | 1,550° C. 2 hrs | 1,650° C. 2 hrs | 1,550° C. 2 hrs | 1,550° C. 2 hrs |
| Temperature and time in the second holding process | | 1,700° C. 2 hrs | 1,700° C. 2 hrs | 1,700° C. 2 hrs | 1,700° C. 2 hrs | 1,750° C. 2 hrs | 1,700° C. 2 hrs | 1,700° C. 2 hrs |
| Atmosphere | | $N_2$: 1.5 atm | $N_2$: 1.2 atm | $N_2$: 1.2 atm | vacuum | $N_2$: 1.2 atm | $N_2$: 1.5 atm | $N_2$: 1.8 atm |
| Pressure (kgf/cm$^2$) | | 50 | 50 | 50 | 25 | 350 | 22 | 0 |
| Joining strength (MPa) | | 440 | 220 | 160 | 100 | 250 | 130 | 100 |
| Amount of leakage | | <$10^{-8}$ | <$10^{-8}$ | <$10^{-8}$ | <$10^{-7}$ | <$10^{-8}$ | — | <$10^{-7}$ |
| Residuum of third layer | | none | none | none | none | none | none | none |

As seen from the above Table 1, all the samples obtained in the Experiments 1–7 of the embodiments of the present invention could provide extremely high joining strengths, while no residuum of the third layer was seen and the leakage amount was small. Among these, the joining body of Experiment 1 using aluminum nitride sintered bodies of a purity of 99.9% as the substrates 1, 2 could exhibit the most high strength. In Experiments 2–7, as the pressure became higher, the joining strength became increased. Also, it was found out that the joinings performed in nitrogen atmosphere can provide higher joining strengths and extremely smaller leakage amount than the joining performed in vacuum in Experiment 4.

After the measurements of the leakage amount, a heating cycle test of 100 cycles of heating between 50° C. and 700° C. in air was put into practice to judge whether the joined body can withstand such a thermal shock or not. In Experiments 1–7, no defect was found and no deterioration of the leakage amount was found. In Table 1, the specimens of Experiments 1–3 showed no deterioration of leakage amount though they were exposed in $NF_3$ plasma at 450° C. for 24 hrs.

Table 7 is a reflex electron image showing a ceramic tissue at the neighborhood of the joining interface of the specimen obtained by Experiment 2 shown in Table 1. The ceramic tissue is seen from the upper side to separate into two layers of an aluminum nitride layer of a purity of 95% and an aluminum nitride layer of a purity of 99.9%. In the bending test specimen obtained by Experiment 1 shown in Table 1. In the neighborhood of the interface between the upper and lower aluminum nitride layers, a distinct boundary cannot be observed and no secondary layer or crack is existent at all to understand that the upper and lower aluminum nitride tissues are directly and continuously joined.

Test 4

In the same manner as described in Test 3, joined bodies (comparative examples) of respective Experiment Nos. 8–12 as shown in Table 2 were produced. Conditions of respective experiments and the results are shown in Table 2.

TABLE 2

| | 8 | 9 | 10 | 11 | 12 |
|---|---|---|---|---|---|
| Purity of AlN | | | | | |
| Substrate 1 | 95% | 95% | 95% | 95% | 95% |
| Substrate 2 | 99.9% | 99.9% | 99.9% | 99.9% | 99.9% |
| Joining agent | | | | | |
| Composition | | | 37CaO—19$Y_2O_3$—44$Al_2$ | | |
| Shape | | | Calcined powder | | |
| Temperature | 1,550° C. | none | 1,400° C. | 1,700° C. | 1,300° C. |

TABLE 2-continued

|  | 8 | 9 | 10 | 11 | 12 |
|---|---|---|---|---|---|
| and time in the first holding process | 2 hrs |  | 2 hrs | 2 hrs | 2 hrs |
| Temperature and time in the second holding | none | 1,700° C. 2 hrs | 1,500° C. 2 hrs | 1,900° C. 2 hrs | 1,700° C. 2 hrs |
| Atmosphere | $N_2$:1.5 atm | $N_2$:1.5 atm | $N_2$:1.5 atm | $N_2$:1.5 atm | $N_2$:1.5 atm |
| Pressure (kgf/cm$^2$) | 50 | 50 | 50 | 50 | 50 |
| Joining strength (MPa) | 130 | 20 | 80 | 60 | 30 |
| Amount of leakage | $<10^{-6}$ | $<10^{-6}$ | $<10^{-5}$ | $<10^{-5}$ | $<10^{-5}$ |
| Residuum of third layer | 70% | none | 80% | none | none |

As seen from Table 2, a comparative sample was held at 1,550° C. for 2 hrs to obtain a somewhat high joining strength in Experiment 8, however, it showed a leakage amount of a level of $10^{-6}$ and residuum of a third layer. When the sample was subjected to a heating cycle test, the joining interface was peeled away. In Experiment 9, a comparative sample was held at 1,700° C. for 2 hrs, however, the joining strength was a still insufficient value of 20 MPa and a leakage amount was a level of $10^{-6}$. The joining agent was exhausted during the heating process and the residuum of a third layer was not seen. In Experiment 10, a comparative sample was held at 1,400° C. for 2 hrs and held at 1,500° C. for 2 hrs, however, the exhaust of a third layer was not seen substantially and the joining agent remained 80% and the leakage amount was a level of $10^{-5}$.

In Experiment 11, a comparative sample was held at 1,700° C. and 1,900° C., respectively for 2 hrs and showed no residuum of a third layer. However, the joining strength was still insufficient and the leakage amount was a level of $10^{-5}$. After subjected to the heating cycle test, the substrates were found to have deformed. In Experiment 12, a comparative sample was held at 1,300° C. and 1,700° C., respectively for 2 hrs and showed no residuum of a third layer. However, the joining strength was still insufficient and the leakage amount was a level of $10^{-5}$. In Experiments 11, 12, the invasion process of the melt into the substrates was considered not to progress.

Test 5

In the same manner as described in Test 3, joined bodies (examples of the present invention) of the respective Experiment Nos. 13–17 as shown in Table 3 were produced. Conditions of respective Experiments and measured results are shown in Table 3. However, a mixed powder before calcining was used in Experiments 13, 14 and 15, and a ground powder obtained by heat treating the mixed powder at 1,360° C. for 2 hrs and then grinding in a vibration mill was used in Experiment 16. In Experiment 17, a foil-shaped sintered body was used obtained by heat treating the mixed powder at 1,360° C. for 2 hrs and then processing at that state into a foil shape of a thickness of 0.5 mm.

TABLE 3

|  | 13 | 14 | 15 | 16 | 17 |
|---|---|---|---|---|---|
| Purity of AlN |  |  |  |  |  |
| Substrate 1 | 99.9% | 95% | 95% | 95% | 95% |
| Substrate 2 | 99.9% | 99.9% | 95% | 99.9% | 99.9% |
| Joining agent |  |  |  |  |  |
| Composition | 37CaO—19$Y_2O_3$—44$Al_2O_3$ | | | | |
| Shape | Mixed powder | | | Ground powder | Sinter body |
| Temperature and time in the first holding process | 1,550° C. 4 hrs | 1,400° C. 4 hrs | 1,650° C. 1 hr | 1,550° C. 8 hrs | 1,550° C. 2 hrs |
| Temperature and time in the second holding process | 1,700° C. 4 hrs | 1,700° C. 2 hrs | 1,800° C. 30 min | 1,660° C. 8 hrs | 1,700° C. 2 hrs |
| Atmposphere | $N_2$:1.5 atm | $N_2$:1.2 atm | $N_2$:1.2 atm | $N_2$:3.0 atm | $N_2$:1.2 atm |
| Pressure (kgf/cm$^2$) | 50 | 50 | 50 | 480 | 50 |
| Joining strength (MPa) | 440 | 120 | 200 | 350 | 250 |
| Amount of leakage | $<10^{-8}$ | $<10^{-8}$ | $<10^{-8}$ | $<10^{-8}$ |  |
| Residuum of third layer | none | none | none | none | none |

As seen from these examples, in either case of using a calcined powder, a powder obtained by grinding the calcined powder or a foil-shaped sintered body, substantially the same results as the case of using the calcined powder could be obtained.

Test 6

In the same manner as described in Test 3, joined bodies of respective Experiment Nos. 18–21 as shown in Table 4 were produced. Conditions of respective Experiments and measured results are shown in Table 4. However, in Experiment 18 (example of the present invention) a ground powder of a composition of 28 CaO—26 $Y_2O_3$—46 $Al_2O_3$ was used, and in Experiments 19, 20 and 21 (comparative examples) a powder of $Y_2O_3$, YN or 80 YF—20 $AlF_2$ was used.

TABLE 4

|  | 18 | 19 | 20 | 21 |
|---|---|---|---|---|
| Purity of AlN |  |  |  |  |
| Substrate 1 | 95% | 95% | 95% | 95% |
| Substrate 2 | 95% | 99.9% | 95% | 99.9% |
| Joining agent |  |  |  |  |
| Composition | 28CaO-26$Y_2O_3$-46$Al_2O_3$ | $Y_2O_3$ | YN | 80Y$F_3$-20Al$F_3$ |
| Shape | Ground powder | Powder | Powder | Mixed powder |
| Temperature and time in the first holding process | 1,550° C. 3 hrs | 1,550° C. 2 hrs | 1,550° C. 2 hrs | 1,550° C. 2 hrs |

TABLE 4-continued

| | 18 | 19 | 20 | 21 |
|---|---|---|---|---|
| Temperature and time in the second holding process | 1,800° C. 1 hr | 1,700° C. 2 hrs | 1,600° C. 2 hrs | 1,700° C. 2 hrs |
| Atmosphere | $N_2$:1.2 atm | $N_2$:1.2 atm | $N_2$:1.2 atm | $N_2$:1.2 atm |
| Pressure (kgf/cm$^2$) | 50 | 50 | 50 | 50 |
| Joining strength (MPa) | 160 | 0 | 0 | 0 |
| Amount of leakage | <10$^{-8}$ | — | — | — |
| Residuum of third layer | none | 100% | — | — |

In Experiment 18 a joined body of a high joining strength and a leakage-proving property was obtained. However, in Experiment 19 $Y_2O_3$ was not at all exhausted and a joined body could not be obtained. In Experiments 20 and 21 the respective powder was not melted to form a joining layer and a joined body could not be obtained.

Test 7

Joined bodies as shown in FIGS. 3 and 4 were produced. However, in these cases, in the susceptor 6 were embedded a molybdenum coil which functions as a heater and a molybdenum mesh which functions as an electrode of a high frequency wave plasma. The sintered body 6 had a purity of 99.9% and relative density of at least 99.5% and was produced by a hot press method.

Also, an annular holding member 8 made of a normal pressure sintered body of an outer diameter of 60 mm, an inner diameter of 52 mm and a length of 210 mm (purity 95% andyttria 5%) was prepared. The susceptor 6 and the holding member 8 were joined according to the present invention.

In the furnace for performing the joining, a hot press made of a carbon material for furnace was used. Heating was effected in a nitrogen atmosphere of a pressure of 1.5 atm, and a pressure of 60 kgf/cm$^2$ was exerted on the joining surface by a hydraulic oil press, while the sample was heated to a temperature of at least 1,300° C. The sample was heated at a temperature elevating rate of 1,00–1000° C./hr, held at 1,550° C. for 2 hrs to cause the joining agent to invade into the joining surfaces of the substrates, and then heated at 1,700° C. for 2 hrs to exhaust the joining agent. After heated at 1,700° C. for 2 hrs, the sample was left cool in the furnace.

The joined body was taken out from the furnace and the amount of leakage was measured in the same manner as described above. As a result, the amount of leakage was less than $1.0 \times 10^{-8}$ torr ·1/sec.

To the molybdenum coil and molybdenum mesh embedded in the interior of the sintered body were attached lead wires of electrodes. The coil and mesh were heated by passing an electric current therethrough to repeat 30 cycles of heat elevation and heat lowering at a rate of about 25° C./min. As a result, no crack or deformation of the joined body was found. After the heating cycle test, the sample was tested again by a helium leakage test to find again a leakage amount of less than $1.0 \times 10^{-8}$ torr ·1/sec.

Test 8

In the same manner described in Test 3, joined bodies (examples of the present invention) of respective Experiment Nos. 22–25 as shown in Table 5 were produced. Conditions of respective Experiments and measured results are shown in Table 5.

TABLE 5

| | 22 | 23 | 24 | 25 |
|---|---|---|---|---|
| Purity of AlN | | | | |
| Substrate 1 | 99.9% | 95% | 95% | 95% |
| Substrate 2 | 99.9% | 99.9% | 95% | 99.9% |
| Joining agent | | | | |
| X | $Li_2O$ 49 mol % | $Li_2O$ 49 mol % | $Li_2O$ 49 mol % | BaO 56 mol % |
| Y | $Y_2O_3$ 26 mol % | $Y_2O_3$ 26 mol % | $Y_2O_3$ 26 mol % | $Y_2O_3$ 7 mol % |
| Z | $Al_2O_3$ 25 mol % | $Al_2O_3$ 25 mol % | $Al_2O_3$ 25 mol % | $Al_2O_3$ 37 mol % |
| Shape | Calcined powder | Calcined power | Calcined power | Calcined power |
| Temperature and time in the first holding process | 1,500° C. 2 hrs | 1,550° C. 2 hrs | 1,550° C. 2 hrs | 1,500° C. 2 hrs |
| Temperature and time in the second holding process | 1,620° C. 1 hr | 1,650° C. 2 hrs | 1,650° C. 2 hrs | 1,650° C. 2 hrs |
| Atmosphere | $N_2$:2.5 atm | $N_2$:1.7 atm | $N_2$:1.7 atm | $N_2$:2.5 atm |
| Pressure (kgf/cm$^2$) | 20 | 20 | 20 | 20 |
| Joining strength (MPa) | 300 | 180 | 120 | 250 |
| Amount of leakage | <10$^{-8}$ | <10$^{-8}$ | <10$^{-8}$ | <10$^{-8}$ |
| Residuum of third layer | none | none | none | none |

In Experiments 22, 23 and 24, a $Li_2O$—$Y_2O_3$—$Al_2O_3$ series calcined powder was used as the joining agent. All of them showed high joining strength, small leakage amount and no residuum of a third phase. From the viewpoint of joining strength, preferably an aluminum nitride substrate of a relative density of 99.9% is used and the pressure of $N_2$ atmosphere is increased to 2.5 atm, as in Experiment 22.

In Experiment 25, a BaO—$Y_2O_3$—$Al_2O_3$ series calcined powder was used as the joining agent. The sample showed high joining strength and small leakage amount.

The samples of Experiments 22–25 were after the measurement of the leakage amount subjected to a heating cycle test of 100 cycles of heating the samples between 50° C. and 700° C. in air. As a result, all the samples showed no defect and no deterioration of the leakage amount. The bending test specimen of Experiment 22 was exposed in $N_2$ plasma at 450° C. for 24 hrs to find no deterioration the joining of strength and the leakage amount.

Test 9

In the same manner as described in Test 3, joined bodies (examples of the present invention) of respective Experiment Nos. 26–30 as shown in Table 6 were produced. Conditions of respective Experiments and measured results are shown in Table 6.

TABLE 6

| | 26 | 27 | 28 | 29 | 30 |
|---|---|---|---|---|---|
| Purity of AlN | | | | | |
| Substrate 1 | 95% | 95% | 95% | 95% | 95% |
| Substrate 2 | 99.9% | 99.9% | 99.9% | 99.9% | 99.9% |
| X | CaO 56 mol % | $CaF_2$ 56 mol % | CaO 55 mol % | CaO 48 mol % | BaO 45 mol % |
| Y | $La_2O_3$ 7 mol % | $Y_2O_3$ 7 mol % | $YF_3$ 14 mol % | $Y_2O_3$ 9 mol % | $La_2O_3$ 5 mol % |

TABLE 6-continued

| | 26 | 27 | 28 | 29 | 30 |
|---|---|---|---|---|---|
| Z | | | | | |
| $Al_2O_3$ | 37 mol % | 37 mol % | 31 mol % | 0 mol % | 25 mol % |
| $AlF_3$ | 0 mol % | 0 mol % | 0 mol % | 43 mo % | 25 mol % |
| Shape | Calcined powder | Calcined powder | Calcined powder | Calcined powder | Calcined powder |
| Temperature and time in the first holding process | 1,550° C. 2 hrs | 1,550° C. 2 hrs | 1,550° C. 1 hr | 1,550° C. 1 hr | 1 hr |
| Temperature and time in the second holding process | 1,620° C. 1 hr | 1,650° C. 2 hrs | 1,700° C. 2 hrs | 1,700° C. 2 hrs | 1,700° C. 2 hrs |
| Atmosphere | $N_2$:1.7 atm | $N_2$:1.7 atm | $N_2$:1.5 atm | $N_2$:1.5 atm | $N_2$:1.5 atm |
| Pressure ($kgf/cm^2$) | 20 | 20 | 30 | 30 | 30 |
| Joining strength (MPa) | 190 | 140 | 100 | 130 | 180 |
| Amount of leakage | $<10^{-8}$ | $<10^{-8}$ | $<10^{-8}$ | $<10^{-8}$ | $<10^{-8}$ |
| Residuum of third layer | none | none | none | none | none |

As the joining agent, a $CaO-La_2O_3-Al_2O_3$ series calcined powder was used in Experiment 26, a $CaF_2-Y_2O_3-Al_2O_3$ series calcined powder was used in Experiment 27, a $CaO-YF_3-Al_2O_3$ series calcined powder was used in Experiment 28, a $CaO-Y_2O_3-Al_2O_3$ series calcined powder was used in Experiment 29, and a $BaO-La_2O_3-Al_2O_3$ series calcined powder was used in Experiment 30. All the samples obtained in these Experiments showed high joining strength, small leakage amount and no existence of a third phase.

As explained in detail in the foregoings, according to the present invention, aluminum nitride series substrates can be joined mutually in the substantial absence of an intervening third layer at the joining interface of the substrates, when joining the aluminum nitride series substrates to each other.

Although the present invention has been explained with specific examples and numeral values, it is of course apparent to those skilled in the art that various changes and modifications thereof are possible without departing from the broad spirit and aspect of the present invention as defined in the appended claims.

What is claimed is:

1. A method for producing a joined body of aluminum nitride-series substrates, comprising a first step of interposing a joining agent between the substrates to be joined, and heating the substrates and the joining agent at a temperature range of not less than the melting point of the joining agent to thereby melt the joining agent and liquefying particles of the aluminum nitride-series substrates to a liquid phase adjacent the interface between the melted joining agent and the substrates, and a second step of heating the substrates and the joining agent at a temperature range of higher than the temperature range of the first step and lower than the sintering temperature of the substrates to thereby exhaust the joining agent from between the substrates.

2. The method for producing a joined body of aluminum nitride-series substrates as defined in claim 1, wherein a pressure is exerted on the joining agent and the substrates in the first and second steps.

3. The method for producing a joined body of aluminum nitride-series substrates as defined in claim 1,
   wherein the joining agent comprises an X-Y-Z composition, wherein X is a compound of a t least one metallic element selected from the group consisting of alkali metal elements and alkaline earth metal elements, Y is a compound of rare earth element, and Z is an aluminum compound, and among the metallic elements constituting the joining agent the proportion of the metallic element constituting X is 25–50 mol %, the proportion of the rare earth element constituting Y is 5–30 mol %, and the rest comprises aluminum; and
   wherein during melting of the joining agent in the first step, the melted joining agent comprises at least one of oxide and fluoride of the metallic elements constituting the compound X, at least one of oxide and fluoride of the rare earth elements and at least one of oxide and fluoride of aluminum.

\* \* \* \* \*